(12) United States Patent
Smith et al.

(10) Patent No.: US 7,060,835 B2
(45) Date of Patent: Jun. 13, 2006

(54) PREPARATION OF YELLOW PIGMENT

(75) Inventors: Norman W. Smith, Cincinnati, OH (US); Russell J. Schwartz, Montgomery, OH (US); Kimberly A. Clark, Cincinnati, OH (US); Terence R. Chamberlain, Montgomery, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 331 days.

(21) Appl. No.: 10/751,245

(22) Filed: Dec. 31, 2003

(65) Prior Publication Data

US 2005/0139127 A1    Jun. 30, 2005

(51) Int. Cl.
*C09B 25/00*    (2006.01)
(52) U.S. Cl. .................... 546/167; 106/31.77; 106/498
(58) Field of Classification Search ................ 546/167; 106/31.77, 498
See application file for complete search history.

(56) References Cited

U.S. PATENT DOCUMENTS

| | | | |
|---|---|---|---|
| 3,622,583 A | | 11/1971 | Dehnert ...................... 260/287 |
| 4,459,233 A | * | 7/1984 | Fabian et al. ................ 540/140 |
| 5,106,980 A | | 4/1992 | Ort et al. .................... 546/167 |
| 5,342,950 A | * | 8/1994 | Kilpper et al. .............. 546/171 |
| 5,738,716 A | | 4/1998 | Santilli et al. ........... 106/31.77 |
| 6,235,099 B1 | * | 5/2001 | Aida et al. ............... 106/31.65 |
| 6,726,762 B1 | * | 4/2004 | Okamoto et al. ........... 106/493 |
| 6,770,331 B1 | | 8/2004 | Mielke et al. ............... 427/496 |
| 2002/0088375 A1 | | 7/2002 | Komatsu et al. ............ 106/472 |
| 2002/0096085 A1 | | 7/2002 | Gotob et al. ............. 106/31.86 |
| 2003/0169523 A1 | | 9/2003 | Takeda ....................... 359/885 |
| 2004/0249088 A1 | | 12/2004 | Hees et al. .................. 525/453 |

FOREIGN PATENT DOCUMENTS

| | | |
|---|---|---|
| GB | 1486022 | 9/1977 |
| JP | 2002105351 | 4/2002 |
| WO | WO 03/029318 A1 | 4/1993 |
| WO | WO 99/01516 | 1/1999 |
| WO | WO 99/01517 | 1/1999 |
| WO | WO 00/17250 | 3/2000 |
| WO | WO 01/12728 A1 | 2/2001 |
| WO | WO 02/00643 A1 | 1/2002 |
| WO | WO 02/053654 A2 | 7/2002 |
| WO | WO 2004/108837 | 12/2004 |

OTHER PUBLICATIONS

English translation of JP 2002-105351 Apr. 10, 2002.*
W. herbst, K. Hunger, Industrial Organic Pigments, pp. 549-550, no date available.

* cited by examiner

*Primary Examiner*—Fiona T. Powers
(74) *Attorney, Agent, or Firm*—Sidney Persley, Esq.

(57) ABSTRACT

A process for preparing transparent Pigment Yellow 138 by grinding Pigment Yellow 138 in the presence of a grinding agent, preparing an aqueous slurry of the ground particles, and filtering the slurry resulting in a filter cake containing particles of transparent Pigment Yellow 138. In addition, a process for improving color strength of an ink and/or plastic composition is also disclosed by adding transparent Pigment Yellow 138 to the composition.

20 Claims, No Drawings

PREPARATION OF YELLOW PIGMENT

FIELD OF THE INVENTION

The invention relates to the preparation of transparent Pigment Yellow 138.

BACKGROUND OF THE INVENTION

Pigment Yellow 138 is well known to be a very lightfast and weatherfast green-shade yellow pigment with good heat stability. Pigment Yellow 138, also known as quinophthalone, is typically used in plastics and paint applications. The most common commercial Pigment Yellow 138 has a relatively low specific surface area of approximately 25 m$^2$/g, which gives good hiding power in systems where opacity is desirable. For most ink systems however, it is desirable to have a high degree of transparency, therefore, pigments having a high specific surface area are required.

Pigment Yellow 138 may be prepared by various means of comminution, including ball milling or kneading in the presence of a grinding agent. However, it has not been know how to prepare Pigment Yellow 138 having a high surface area exhibiting strong color strength and transparency while also having lightfastness.

The preparation of quinophthalone pigments is described in the prior art. For example, condensation of 2-methylquinoline derivatives (quinaldine derivatives) with aromatic ortho-dicarboxylic acids or their anhydrides is carried out in the presence of inert high-boiling diluents such as ortho-dichlorobenzene, trichlorobenzene, nitrobenzene, naphthalene, diphenyl or diphenyl ether (Chimia 24, 328, 1970; GB-A1,091,734). U.S. Pat. No. 5,106,980 discloses a process for the preparation of quinophthalones by condensation of 8-aminoquinaldine with phthalic anhydride optionally monosubstituted or polysubstituted by chlorine or bromine, in the presence of a diluent, resulting in relatively low specific surface area and opaque pigment. U.S. Pat. No. 3,622,583 describes a process for the preparation of yellow dye quinophthalone derivatives by heating 8-aminoquinaldine with tetrachlorophthalic anhydride or tetrabromophthalic anhydride in the presence of other solvents and at a temperature of 130–300° C. According to the *Industrial Organic Pigments*, by Herbst, W. and Hunger, K. VCH., Yellow 138 pigments that possess higher surface area exhibit somewhat lower lightfastness properties. However, the prior art processes result in relatively low specific surface area Pigment Yellow 138 and therefore are mostly opaque.

Thus, there exists a need for Pigment Yellow 138 having increased transparency and lightfastness while maintaining standard coloristic properties in a printing ink such as color strength and tint strength.

SUMMARY OF THE INVENTION

It has now been found that the above objectives can be realized by a process for preparing transparent Pigment Yellow 138 comprising:
 (a) grinding Pigment Yellow 138 in the presence of a grinding agent;
 (b) preparing an aqueous slurry of the ground pigment;
 (c) filtering said slurry resulting in a filter cake containing particles of transparent Pigment Yellow 138.

The present invention also provides a process for improving transparency and color strength in an ink or a plastic composition comprising adding transparent Pigment Yellow 138 to said composition.

Other objects and advantages of the present invention will become apparent from the following description and appended claims.

DETAILED DESCRIPTION OF INVENTION

The present invention is a process for preparing a more transparent Pigment Yellow 138 which surprisingly exhibits little if any loss in strength, chroma or shade in the ink masstone while exhibiting good lightfastness.

The process is a mill process which may be carried out in any conventional apparatus such as a kneader, ball mill apparatus or any suitable such container. The process combines Pigment Yellow 138 and salt which are milled, with a wetting agent as necessary, and then the prepared pigment is isolated with water, heated, and dried.

The starting pigment is any Pigment Yellow 138 or quinophthalone yellow, such as that commercially available from BASF-0961. Typically, between half to three parts pigment is used.

Suitable salts for use in the process include, but are not limited to inorganic salts, sodium chloride, sodium sulfate, calcium chloride, calcium sulfate, and the like, and combinations thereof. A preferred salt is sodium chloride. Typically, the salt is between about 1 to about 20 parts based on the starting pigment.

Suitable wetting agents for use in the process may include, but are not limited to, water miscible solvents and glycolic solvents such as ethylene glycol, diethylene glycol, propylene glycol, dipropylene glycol, polypropylene glycol, propylene carbonate, carbitol acetate, and the like. It is preferred that the wetting agent is diethylene glycol.

The starting pigment and salt are combined in a mill container and milled at a temperature of about 50° C. to about 100° C. for about thirty minutes to about 7 hours. It is preferred that the temperature be about 80–100° C. and the milling continue for about 1 to about 2 hours.

If a kneader is used, then the wetting agent is added. If a ball mill is used then balls are added, which may be of any appropriate material, such as, but not limited to glass, zirconium oxide, and the like. The balls typically have a size of about 0.5–10 mm and are added at about 100 to 200 parts based on the pigment.

Upon completion of the milling process, the mixture is isolated by preparing an aqueous slurry through mixing the mill contents with about 25 to about 150 parts water, then stirring at about 30° C. to about 100° C. for a period of about thirty minutes to about 3 hours. The resulting slurry is filtered and the filter cake is thoroughly washed with tap water until equivalent conductivity is attained, followed by deionized water, if desired. The washed filter cake is dried at about 50° C. to about 150° C.

The resultant pure and transparent Yellow Pigment 138 may be formulated into a variety of ink systems resulting in yellow inks which are strong, cleaner and more transparent than corresponding inks made from the common commercial Pigment Yellow 138 while exhibiting virtually identical lightfastness and masstone properties. Surprisingly, little if any loss in color strength, chroma or shade in the ink masstone was experienced upon its exposure to light for up to 200 hours. Similar exposure of the reduced ink film (ink tint) demonstrated only a minor decrease in its lightfastness relative to the corresponding film of the common commercial pigment.

The process of the present invention is further illustrated by the following non-limiting examples in which all parts and percentages are by weight, unless otherwise indicated.

EXAMPLE 1

Pigment (1 part), sodium chloride (10 parts), and diethylene glycol (2 parts) were mixed for one hour at 88° C. The resulting slurry mixture was placed into 100 parts of water and mixed thoroughly while maintaining temperature at 80–90° C. for one hour. The slurry was filtered and washed with tap water until the conductivity of the filtrates was equal to that of the wash water. The resulting solid Pigment Yellow 138 was dried and had a surface area of 80 $m^2/g$.

EXAMPLE 2

Pigment (1 part), sodium chloride (5 parts) and glass beads (100 parts) were milled for 3 hours, with frequent scraping down the sides of the mill. The milled pigment was mixed with water (100 parts) at 80–90° C. for one hour and the beads removed with a coarse strainer. The aqueous slurry was filtered, washed and dried as in Example 1. The resulting solid Pigment Yellow 138 had a surface area of 55 $m^2/g$

EXAMPLE 3 (COMPARISON)

Pigment Yellow 138 of Example 1 having a surface area of 80 $m^2/g$ was tested for lightfastness compared to conventional commercial Pigment Yellow 138 having a surface area of 25 $m^2/g$. Both pigments were drawn down on a substrate and exposed to light for up to 200 hours. The larger surface area pigment of Example 1 exhibited comparable lightfastness compared to the conventional pigment of smaller surface area.

EXAMPLE 4 (COMPARISON)

The pigment of Example 1 having a surface area of 80 $m^2/g$ was incorporated into a typical solvent ink film and compared with a solvent ink film containing a conventional commercial Pigment Yellow 138 having a surface area of about 25 $m^2/g$. Both solvent ink films were exposed to 192 hours of sunlight under identical conditions of light, temperature and ambient humidity, and then tested for tint strength and color strength and CIELAB value for ΔE* using the Color Tools® from Datacolor International of Lawrenceville, N.J. The results of the test for color strength and masstone are set forth in Table 1 below.

TABLE 1

| Pigment in the solvent ink film | Tint ΔE | Tint Strength |
|---|---|---|
| Example 1 | 1.3 | −7% |
| Conventional | 0.74 | −1% |

The respective masstones of each solvent ink film displayed essentially no change in strength or ΔE value (relative to their non-exposed areas), while the corresponding ink tints exhibited comparable color strength decreases.

EXAMPLE 5 (COMPARISON)

The pigment of Example 1 having a surface area of 80 $m^2/g$ was incorporated into a typical aqueous ink film and compared with an aqueous ink film containing a conventional commercial Pigment Yellow 138 having a surface area of about 25 $m^2/g$. Both aqueous ink films were exposed to 192 hours of sunlight under identical conditions of light, temperature and ambient humidity, and then tested for tint strength and color strength according to the method of Example 4. The results of the test for color strength and masstone are set forth in Table 1 below.

TABLE 1

| Pigment in the solvent ink film | Tint ΔE | Tint Strength |
|---|---|---|
| Example 1 | 3.5 | −11% |
| Conventional | 3.0 | −11% |

The respective masstones of each aqueous ink film displayed essentially no change in strength or ΔE value (relative to their non-exposed areas), while the corresponding ink tints exhibited comparable color strength decreases.

EXAMPLE 6 (COMPARISON)

The pigment of Example 2 having a surface area of about 55 $m^2/g$ was incorporated into a plastic (LDPE) and compared with a plastic containing a conventional commercial Pigment Yellow 138 having a surface area of about 25 $m^2/g$. Both plastics were exposed to temperatures of between 400–525° F. to test for coloristic properties of masstone and color strength by the method set forth in Example 4.

Little or no differences in the respective ΔE values were observable over this temperature range although the higher surface area pigment of Example 2 exhibited a significantly stronger shade in the tint (of 45–50%) throughout the range, compared to the conventional pigment having surface area of about 25 $m^2/g$.

The invention has been described in terms of preferred embodiments thereof, but is more broadly applicable as will be understood by those skilled in the art. The scope of the invention is only limited by the following claims.

What is claimed is:

1. A process for preparing transparent Pigment Yellow 138 comprising:
   (a) grinding Pigment Yellow 138 in the presence of a grinding agent;
   (b) preparing an aqueous slurry of the ground pigment;
   (c) filtering said slurry resulting in a filter cake containing particles of transparent Pigment Yellow 138.

2. The process of claim 1, wherein the grinding agent is an inorganic salt.

3. The process of claim 2, wherein the inorganic salt is selected form the group consisting of sodium chloride, sodium sulfate, calcium chloride, calcium sulfate, and combinations thereof.

4. The process of claim 3 wherein the inorganic salt is sodium chloride.

5. The process of claim 1, wherein step (a) is carried out in the presence of a wetting agent.

6. The process of claim 5, wherein the wetting agent is a glycolic solvent.

7. The process of claim 6, wherein the glycolic solvent is selected from the group consisting of ethylene glycol, diethylene glycol, propylene glycol, dipropylene glycol, polypropylene glycol, propylene carbonate, carbitol acetate.

8. The process of claim 1, wherein the grinding step (a) is at a temperature of about 50 to about 100° C.

9. The process of claim 8, wherein the grinding step (a) is at a temperature of about 80 to about 100° C.

10. The process of claim 1, wherein the slurry is heated at a temperature of about 30 to 100° C.

11. The process of claim 10 wherein the slurry is heated for a period of about 30 minutes to about 3 hours.

12. The process of claim 1, wherein particles of said transparent Pigment Yellow 138 have a surface area of greater than about 50 m$^2$/g.

13. The process of claim 12, wherein said surface area is about 50 m$^2$/g to about 100 m$^2$/g.

14. The process of claim 1, further comprising washing the filter cake with water and drying it at a temperature of about 50 to about 150° C.

15. A process for improving color strength of an ink composition comprising adding transparent Pigment Yellow 138 prepared by the process of claim 1 to said ink composition.

16. The process of claim 15, wherein a particle of said transparent Pigment Yellow 138 has a surface area of greater than about 50 m$^2$/g.

17. The process of claim 16, wherein said surface area is about 50 m$^2$/g to about 100 m$^2$/g.

18. A process for improving color strength of a plastic composition comprising adding transparent Pigment Yellow 138 prepared by the process of claim 1 to said plastic composition.

19. The process of claim 18, wherein a particle of said transparent Pigment Yellow 138 has a surface area of greater than about 50 m$^2$/g.

20. The process of claim 19, wherein said surface area is about 50 m$^2$/g to about 100 m$^2$/g.

\* \* \* \* \*